(12) United States Patent
Dee et al.

(10) Patent No.: US 7,534,398 B2
(45) Date of Patent: May 19, 2009

(54) APPARATUS FOR THE GENERATION OF CHLORINE DIOXIDE

(75) Inventors: Thomas J. Dee, Holliston, MA (US); Charles O'Hara, Waltham, MA (US); Peter Mulcahy, legal representative, Ponte Vedra Beach, FL (US)

(73) Assignee: TBS Technologies, LLC

( * ) Notice: Subject to any disclaimer, the term of this patent is extended or adjusted under 35 U.S.C. 154(b) by 403 days.

(21) Appl. No.: 11/281,209

(22) Filed: Nov. 15, 2005
(Under 37 CFR 1.47)

(65) Prior Publication Data

US 2007/0154362 A1 Jul. 5, 2007

Related U.S. Application Data

(60) Provisional application No. 60/643,751, filed on Jan. 13, 2005, provisional application No. 60/696,119, filed on Jul. 1, 2005, provisional application No. 60/628,461, filed on Nov. 16, 2004.

(51) Int. Cl.
*A62B 7/08* (2006.01)
*B01J 10/00* (2006.01)

(52) U.S. Cl. ............ 422/122; 422/123; 422/129; 95/90; 95/132; 206/0.7

(58) Field of Classification Search ......... 422/105, 422/120, 122, 129, 123, 236, 300, 305; 206/524.7, 206/0.7; 383/113; 95/90, 132; 252/181.3, 252/181.7

See application file for complete search history.

(56) References Cited

U.S. PATENT DOCUMENTS

| | | | |
|---|---|---|---|
| 3,816,077 A | 6/1974 | Fuller et al. | |
| 4,414,193 A | 11/1983 | Fredette et al. | |
| 4,555,323 A | 11/1985 | Collier | |
| 5,009,875 A * | 4/1991 | Kelley et al. | 423/477 |
| 5,126,070 A * | 6/1992 | Leifheit et al. | 252/186.36 |
| 5,968,454 A * | 10/1999 | Deacon et al. | 422/120 |
| 6,238,643 B1 | 5/2001 | Thangaraj et al. | |
| 6,602,466 B2 * | 8/2003 | Hamilton et al. | 422/37 |
| 6,764,661 B1 * | 7/2004 | Girard | 422/305 |
| 6,855,294 B2 * | 2/2005 | Taylor | 422/105 |
| 2004/0241065 A1 * | 12/2004 | Kampa et al. | 422/305 |

FOREIGN PATENT DOCUMENTS

WO WO 99/24356 * 5/1999

* cited by examiner

*Primary Examiner*—N. Bhat
(74) *Attorney, Agent, or Firm*—Edwards Angell Palmer & Dodge LLP; Jonathan M. Sparks (57) ABSTRACT

The instant application provides apparatus and methods for the generation of chlorine dioxide. The methods and apparatus of the invention use a water dissolvable membrane to allow the reaction of precursor chemicals, e.g., chlorite salt and an acid. The methods and compositions of the invention provide chlorine dioxide for a number of personal and commercial applications.

20 Claims, 7 Drawing Sheets

APPARATUS FOR THE GENERATION OF CHLORINE DIOXIDE

RELATED APPLICATIONS

This application claims the benefit of U.S. Provisional Application No.: 60/628,461, filed on Nov. 16, 2004, U.S. Provisional Application No.: 60/643,751, filed on Jan. 13, 2005, and U.S. Provisional Application No.: 60/696,119, filed on Jul. 1, 2005. The entire contents of each of the aforementioned applications is hereby incorporated herein by reference.

FIELD OF THE INVENTION

The present invention relates to methods and apparatuses for the generation of chlorine dioxide, e.g., aqueous chlorine dioxide or gaseous chlorine dioxide for small scale applications.

BACKGROUND OF THE INVENTION

Chlorine dioxide was discovered in the early 1800's, and was adopted by commerce in the United States in the 1940's. Chlorine dioxide has been called the ideal biocide and the ability of chlorine dioxide to reduce or eliminate microbes, e.g., bacteria, viruses, fungi, mold spores, algae and protozoa, is well-documented and well known. See, for example, Franklin, C.L. et al. (1991) *Am Vet Med Assoc* 198:1625-30; Korich K. G., et al. (1990) *Appl Environ Microbiol.* 56:1423-8; Boddie et al. (2000) *J Dairy Sci.* 83:2975-9; Lee et al. (2004) *J Food Prot.* 67:1371-6; Han et al. (2003) *J Environ Health* 66:16-21; Sy et al. (2005) *J Food Prot.* 68:1176-87; and LeChevallier M.W. etal. (1988) *Appl Environ Microbiol.* 54:2492-9.

Chlorine dioxide inactivates microorganisms by oxidizing key components of a micro-organism's membrane proteins that are vital to the membrane's structure and function. Also, the oxidizing reaction that causes microorganism inactivation does not form trihalomethanes (THMs) or haloacetic acids (HAAs).

Approvals and registrations for use of chlorine dioxide in a wide variety of applications have been granted by the EPA, FDA and USDA, and such approvals and registrations have led to an increasing adoption of the use of chlorine dioxide.

There are many reasons for the ongoing expansion of chlorine dioxide use including its effectiveness against microorganisms at very low concentrations.

A major limitation to the use of chlorine dioxide is that chlorine dioxide can not be manufactured in bulk at an industrial gas plant and shipped to final use destinations. Accordingly, chlorine dioxide must be generated on-site.

The use of chlorine dioxide in large scale applications is well known, however, the use of chlorine dioxide in small scale applications has not been widely adopted. The lack of adoption in small scale applications is a result of the limitations in the prior art with respect to the cost, speed, size and user friendly generation of chlorine dioxide in sufficient concentration and purity to be useful. However, there are many small scale applications that would benefit from the use of chlorine dioxide as a disinfectant or sanitizing agent.

The present invention provides methods, apparatus and systems for generating and dispensing chlorine dioxide, e.g., high purity useful concentrations of chlorine dioxide, that are fast, low cost, effective, compact and simple to use, thus remedying the deficiencies and limitations posed by the prior art which-have impeded adoption for small scale uses.

The present invention will result in the increased adoption and use of this effective anti-microbial agent, with significant economic and health benefits to society.

SUMMARY OF THE INVENTION

The instant invention provides apparatus and methods for on-site generation of small volumes of chlorine dioxide gas. The invention has a number of aspects and embodiments which will be described below.

In one aspect, the invention provides an apparatus for the generation of chlorine dioxide comprising, a reaction chamber comprising a precursor chemical containing structure, a product tank, a filter placed between the product tank and the reaction chamber, a pump on the product tank side of the filter, and a pump on the reaction chamber side of the filter, wherein the precursor chemical containing structure comprises a structure containing precursor chemicals separated by a dissolvable partition, wherein the partition dissolves when contacted by an aqueous solution thereby allowing the reaction of the precursor chemicals, and wherein the pump on the reaction chamber side of the filter circulates an aqueous solution.

In one embodiment of the invention, the pump on the product tank side circulates an aqueous solution into which the chlorine dioxide is transferred. In a related embodiment, there is at least one porous frit in the product tank to increase the rate and/or amount of chlorine dioxide transferred into the aqueous solution.

In another embodiment, the precursor chemical containing structure contains a chlorite salt and an acid. In a related embodiment, the chlorite salt is sodium chlorite, lithium chlorite, barium chlorite, calcium chlorite, magnesium chlorite, or potassium chlorite. In a specific embodiment, the chlorite salt is sodium chlorite. In another related embodiment, the acid is selected from the group consisting of boric acid, tartaric acid, lactic acid, maleic acid, malic acid, glutaric acid, adipic acid, acetic acid, formic acid, sulfamic acid, sulfuric acid, hydrochloric acid, phosphoric acid, phosphoric anhydride, a sulfuric anyhdride and citric acid. In a specific. embodiment, the acid is citric acid. In another specific embodiment, the precursor chemical containing structure contains sodium chlorite and citric acid.

In various embodiments, the precursor chemical containing structure contains two, three, four, five or six times the amount, e.g. the weight or volume, of citric acid as compared to sodium chlorite.

In another embodiment, the dissolvable partition is comprised of polyvinyl alcohol.

In another embodiment, the apparatus has a dispensing device. In a specific embodiment, the apparatus has a filter located between the product tank and the dispensing device. In a related embodiment, the dispensing device is means for atomizing the chlorine dioxide solution. In another alternate embodiment, the apparatus has both a means for dispensing both a solution and atomizing the solution.

In one embodiment, the reaction chamber comprising a precursor chemical containing structure is disposable. In an alternate embodiment, the precursor chemical containing structure within the reaction chamber is disposable.

In another embodiment, the apparatus has a means for mixing the solution in the reaction chamber.

In one embodiment the chlorine dioxide is at least 50% pure.

In another embodiment, the apparatus further comprises a computer interface to control the apparatus.

In another embodiment, the apparatus is portable.

In another embodiment, the apparatus comprises a means for being connected to a water supply.

In another aspect, the invention provides an apparatus for the generation of chlorine dioxide comprising, a reaction chamber comprising a precursor chemical containing structure, a product tank, a filter placed between the product tank and the reaction chamber, a pump on the product tank side of the filter, a pump on the reaction chamber side of the filter, and a means for creating a vacuum on the product tank side of the membrane, wherein the precursor chemical containing structure comprises a structure containing precursor chemicals separated by a dissolvable partition, and wherein the partition dissolves when contacted by an aqueous solution thereby allowing the reaction of the precursor chemicals, and wherein creation of the vacuum results in chlorine dioxide being transferred to the product tank.

In one embodiment of the invention, the pump on the product tank side circulates an aqueous solution into which the chlorine dioxide is transferred. In a related embodiment, there is at least one porous frit in the product tank to increase the rate and/or amount of chlorine dioxide transferred into the aqueous solution.

In another embodiment, the precursor chemical containing structure contains a chlorite salt and an acid. In a related embodiment, the chlorite salt is sodium chlorite, lithium chlorite, barium chlorite, calcium chlorite, magnesium chlorite, or potassium chlorite. In a specific embodiment, the chlorite salt is sodium chlorite. In another related embodiment, the acid is selected from the group consisting of boric acid, tartaric acid, lactic acid, maleic acid, malic acid, glutaric acid, adipic acid, acetic acid, formic acid, sulfamic acid, sulfuric acid, hydrochloric acid, phosphoric acid, phosphoric anhydride, a sulfuric anyhdride and citric acid. In a specific embodiment, the acid is citric acid. In another specific embodiment, the precursor chemical containing structure contains sodium chlorite and citric acid.

In various embodiments, the precursor chemical containing structure contains two, three, four, five or six times the amount, e.g., the weight or volume, of citric acid as compared to sodium chlorite.

In another embodiment, the dissolvable partition is comprised of polyvinyl alcohol.

In another embodiment, the apparatus has a dispensing device. In a specific embodiment, the apparatus has a filter located between the product tank and the dispensing device.

In one embodiment, the reaction chamber comprising a precursor chemical containing structure is disposable. In an alternate embodiment, the precursor chemical containing structure within the reaction chamber is disposable.

In another embodiment, the apparatus has a means for mixing the solution in the reaction chamber.

In one embodiment the chlorine dioxide is at least 50% pure.

In another embodiment, the apparatus further comprises a computer interface to control the apparatus.

In another embodiment, the apparatus is portable.

In another embodiment, the apparatus comprises a means for being connected to a water supply.

In another aspect, the invention provides an apparatus for the generation of chlorine dioxide comprising, a reaction chamber comprising a precursor chemical containing structure, a product tank, a filter placed between the product tank and the reaction chamber, a pump on the product tank side of the filter, a pump on the reaction chamber side of the filter, wherein the pump on the product tank side of the filter pumps air, and wherein the precursor chemical containing structure comprises a structure containing precursor chemicals separated by a dissolvable partition, wherein the partition dissolves when contacted by an aqueous solution thereby allowing the reaction of the precursor chemicals, and wherein the pump on the product tank side of the filter pumps air resulting in the transfer of chlorine dioxide from the reaction chamber into the product tank.

In another embodiment, the precursor chemical containing structure contains a chlorite salt and an acid. In a related embodiment, the chlorite salt is sodium chlorite, lithium chlorite, barium chlorite, calcium chlorite, magnesium chlorite, or potassium chlorite. In a specific embodiment, the chlorite salt is sodium chlorite. In another related embodiment, the acid is selected from the group consisting of boric acid, tartaric acid, lactic acid, maleic acid, malic acid, glutaric acid, adipic acid, acetic acid, formic acid, sulfamic acid, sulfuric acid, hydrochloric acid, phosphoric acid, phosphoric anhydride, a sulfuric anyhdride and citric acid. In a specific embodiment, the acid. In another specific embodiment, the precursor chemical containing structure contains sodium chlorite and citric acid.

In various embodiments, the precursor chemical containing structure contains two, three, four, five or six times the amount, e.g., the weight or volume, of citric acid as compared to sodium chlorite.

In another embodiment, the dissolvable partition is comprised of polyvinyl alcohol.

In another embodiment, the apparatus has a dispensing device. In a specific embodiment, the apparatus has a filter located between the product tank and the dispensing device. In another alternate embodiment, the apparatus has both a means for dispensing both a solution and atomizing the solution.

In one embodiment, the reaction chamber comprising a precursor chemical containing structure is disposable. In an alternate embodiment, the precursor chemical containing structure within the reaction chamber is disposable.

In another embodiment, the apparatus has a means for mixing the solution in the reaction chamber.

In one embodiment the chlorine dioxide is at least 50% pure.

In another embodiment, the apparatus further comprises a computer interface to control the apparatus.

In another embodiment, the apparatus is portable.

In another embodiment, the apparatus comprises a means for being connected to a water supply.

In another aspect, the invention provides an n apparatus for the generation of chlorine dioxide comprising, a reaction chamber comprising a precursor chemical containing structure and a means for restricting airflow into the reaction chamber, a product tank, and a pump on the outlet side of the reaction chamber, wherein the precursor chemical containing structure comprises a structure containing precursor chemicals separated by a dissolvable partition, wherein the partition dissolves when contacted by an aqueous solution thereby allowing the reaction of the precursor chemicals, and wherein the pump and means for restricting air flow create a vacuum thereby allowing gaseous chlorine dioxide to be transferred from the reaction chamber into the product tank.

In one embodiment of the invention, the pump on the product tank side circulates an aqueous solution into which the chlorine dioxide is transferred. In a related embodiment, there is at least one porous frit in the product tank to increase the rate and/or amount of chlorine dioxide transferred into the aqueous solution.

In another embodiment, the precursor chemical containing structure contains a chlorite salt and an acid. In a related embodiment, the chlorite salt is sodium chlorite, lithium chlorite, barium chlorite, calcium chlorite, magnesium chlorite, or potassium chlorite. In a specific embodiment, the chlorite salt is sodium chlorite. In another related embodiment, the acid is selected from the group consisting of boric acid, tartaric acid, lactic acid, maleic acid, malic acid, glutaric acid, adipic acid, acetic acid, formic acid, sulfamic acid, sulfuric acid, hydrochloric acid, phosphoric acid, phosphoric anhydride, a sulfuric anyhdride and citric acid. In a specific embodiment, the acid is citric acid. In another specific embodiment, the precursor chemical containing structure contains sodium chlorite and citric acid.

In various embodiments, the precursor chemical containing structure contains two, three, four, five or six times the amount, e.g., the weight or volume, of citric acid as compared to sodium chlorite.

In another embodiment, the dissolvable partition is comprised of polyvinyl alcohol.

In another embodiment, the apparatus has a dispensing device. In a specific embodiment, the apparatus has a filter located between the product tank and the dispensing device. In a related embodiment, the dispensing device is means for atomizing the chlorine dioxide solution. In another alternate embodiment, the apparatus has both a means for dispensing both a solution and atomizing the solution.

In one embodiment, the reaction chamber comprising a precursor chemical containing structure is disposable. In an alternate embodiment, the precursor chemical containing structure within the reaction chamber is disposable.

In another embodiment, the apparatus has a means for mixing the solution in the reaction chamber.

In one embodiment the chlorine dioxide is at least 50% pure.

In another embodiment, the apparatus further comprises a computer interface to control the apparatus.

In another embodiment, the apparatus is portable.

In another embodiment, the apparatus comprises a means for being connected to a water supply.

In another embodiment, the invention provides a precursor chemical containing structure comprising, a structure containing precursor chemicals separated by dissolvable partitions, wherein the partition dissolves when contacted by an aqueous solution thereby allowing the reaction of the precursor chemicals.

In one embodiment, precursor chemical containing structure contains two chemicals separated by a dissolvable partition.

In another related embodiment, the precursor chemical containing structure is rigid. In an alternate embodiment, the precursor chemical containing structure is non-rigid. In related embodiments, the precursor chemical containing structure is made of tyvek, plastic, or a polymer. In a specific embodiment, the precursor chemical containing structure is made of plastic.

In another embodiment, the dissolvable partition in the precursor chemical containing structure is made of polyvinyl alcohol, polylactic acid, or ethylene vinyl alcohol.

In another embodiment, the precursor chemical containing structure further comprises a microchip for communication with an apparatus which controls the reaction of the precursor chemicals.

In another embodiment, the precursor chemical containing structure further comprises a rigid outer reaction chamber. In a related embodiment, the rigid outer reaction chamber comprises fittings for attaching a an aqueous solution source.

In another related embodiment, the reaction chamber further comprising a means for mixing the contents of the chamber.

In another embodiment, the precursor chemical containing structure contains a chlorite salt and an acid. In a related embodiment, the chlorite salt is sodium chlorite, lithium chlorite, barium chlorite, calcium chlorite, magnesium chlorite, or potassium chlorite. In a specific embodiment, the chlorite salt is sodium chlorite. In another related embodiment, the acid is selected from the group consisting of boric acid, tartaric acid, lactic acid, maleic acid, malic acid, glutaric acid, adipic acid, acetic acid, formic acid, sulfamic acid, sulfuric acid, hydrochloric acid, phosphoric acid, phosphoric anhydride, a sulfuric anyhdride and citric acid. In a specific embodiment, the acid is citric acid. In another specific embodiment, the precursor chemical containing structure contains sodium chlorite and citric acid.

In various embodiments, the precursor chemical containing structure contains two, three, four, five or six times the amount, e.g., the weight or volume, of citric acid as compared to sodium chlorite.

In another embodiment, the precursor chemical containing structure, further comprises a means for the apparatus to identify the precursor chemical containing structure, e.g., a microchip, a physical key, or a barcode.

The invention also provides methods of generating chlorine dioxide using the apparatus described herein.

DETAILED DESCRIPTION OF THE INVENTION

The instant invention provides apparatus for the generation of chlorine dioxide in a variety of small volumetric applications and concentrations for such applications, including, but not limited to: food dispensing services, food preparation equipment, dental equipment, medical equipment, medical facilities, recreational vehicles, boats, emergency disinfection needs, deodorizing, and many other uses.

The present invention provides easy to use, low cost methods, devices and systems for the generation of chlorine dioxide. In some embodiments, the apparatus of the invention can generate solutions of chlorine dioxide from 1.0 mg/l to 1,000 mg/l, typically from 5 mg/l to 500 mg/l in a desired volume of aqueous solution. In specific embodiments of the invention, the product storage tank contains 0.5, 1, 2, 3, 4, 5, 10, 15, 20, 30, 40 or 50 liters of aqueous solution into which the chlorine dioxide is transferred. The apparatus of the invention generates the chlorine dioxide in between 1 and 20 minutes, having a desired volume, concentration and purity level.

In certain embodiments, the apparatus of the invention generates chlorine dioxide that is at least, for example, 50%, 55%, 60%, 65%, 70%, 75%, 80%, 85%, 90%, 91%, 92%, 93%, 94%, 95%, 96%, 97%, 98%, 99%, 99.5%, or more pure, depending on the specific application for which the chlorine dioxide is being used for.

The chlorine dioxide generated may be used for disinfectant or sanitizing purposes immediately or used over a period of time and may be diluted prior to use or used at the generated concentration depending on specific disinfection or sanitation requirements. In certain embodiments, the chlorine dioxide generated may be used in gas form rather than as an aqueous solution. In other embodiments, the chlorine dioxide solution may be dispensed as a "mist". As used herein the terms, mist, fog, and vapor are intended to imply that aqueous chlorine dioxide is dispersed into the surrounding air through means that are common to one of skill in the art. Each of the embodiments may incorporate a misting or "fogging" functionality by providing appropriate misting or atomizing spray heads or similar functional structures and providing pressure from the product tank aqueous solution such that the product tank aqueous solution is fed to the misting head. In another embodiment, pressurized air and pressurized product liquid are mixed at, before or after the misting or atomizing head.

In preferred embodiments, the precursor chemicals are contained within a precursor chemical containing structure comprising dry powder precursor chemicals separated by a dissolvable partition, contained within a structure that allows for an aqueous solution to enter and chlorine dioxide to exit. However, one of skill in the art will realize that there are alternative exits to the preferred precursor chemical containing structure. Precursor chemicals may be disposed within a precursor chemical containing structure or structures in numerous additional ways/methods to include but not limited to the following methods: dry powder form; dry powder mixed together in a tea-bag structure; dry powder separated into two tea-bag structures; dry powder separated into two membrane structures; dry powder mixed together in a dissolvable (water soluble) film bag; dry powder separated into two dissolvable (water soluble) film bags; dry powder mixed together in a dissolvable (water soluble) gel tablet; dry powder separated into two dissolvable (water soluble) gel tablets; dry powder separated into two dry pills. In cases where the precursor chemical containing structure is made from a hydrophilic heat-sealable material, such material may be made with a sufficiently small pore size that it will provide some containment of undesirable residuals.

The apparatus of the invention will need power to operate. Possible power sources include, but are not limited to 230 voltAC, 115 voltAC, 24 voltDC, 12 voltDC, 9 voltDC, 6 voltDC, or 3 voltDC.

Figure 1:
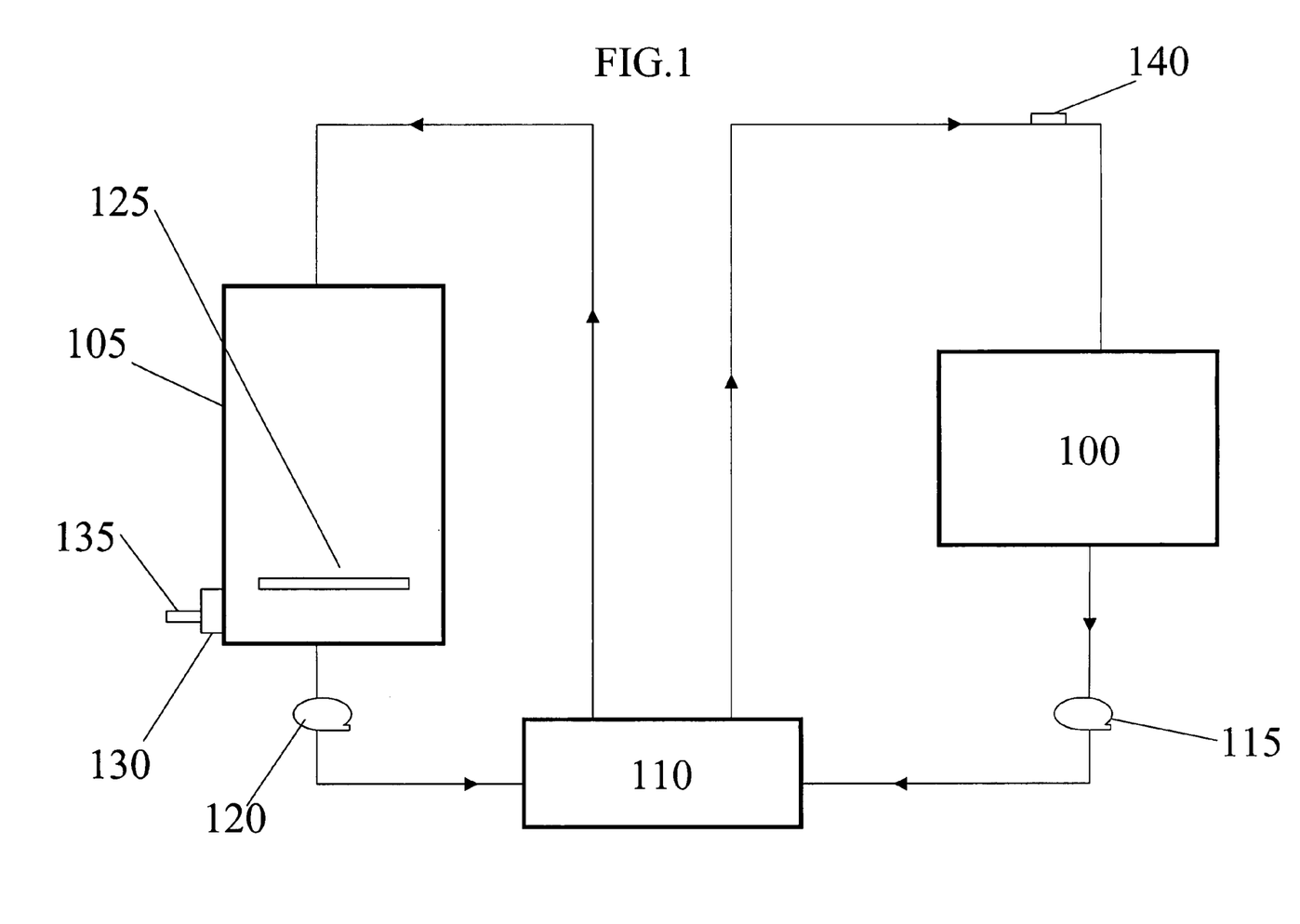
FIG. 1 is a schematic diagram depicting one embodiment of the invention.

FIG. 1 depicts an embodiment of the invention that has an aqueous solution on either side of filter 110, wherein chlorine dioxide generated by the apparatus is transferred into an aqueous solution. As shown in FIG. 1, in this embodiment of the invention the apparatus comprises a reaction chamber 100, pump 115, and optionally a connection to a water source 140 on one side of filter 110 The apparatus further comprises pump 120 and product tank 105 on the other side of filter 110. Product tank 105 may further comprise dispensing device 135, filter 130, or one or more porous frits 125.

Porous frits 125 act to disperse the air containing the chlorine dioxide gas into a large number of small bubbles containing chlorine dioxide gas thereby increasing the rate and amount of chlorine dioxide dissolved in the liquid of the product tank In certain embodiments, reaction chamber 100 contains the precursor chemical containing structure and this unit is disposable. In this embodiment, reaction chamber 100 is a disposable unit that is replaced each time the reaction cycle is started.

In alternate embodiments, reaction chamber 100 may contain one or more internal structural components that function to hold the precursor chemical containing structure in a specific orientation within the reaction chamber 100. In this embodiment only the precursor chemical containing structure is disposable, and a new precursor chemical containing structure is used for each reaction cycle.

Filter 110 may be comprised of any one of a variety of materials that allows for the transfer of chlorine dioxide, but not of impurities often associated with the generation of chlorine dioxide, e.g., chlorites, chlorates and unreacted precursor chemicals. Filter 110 may be any material with a pore size sufficient to allow passage of chlorine dioxide, but not one or more impurities to pass to the product tank side of the filter. The filter may be constructed in a variety of manners, for example: one or more membrane structures or one or more non-wovens or one or more nano-fiber coated non-wovens, and may be configured in a variety of geometries, for example: flat sheet or flat sheets, flat sheets with alternating water pathway layers, spiral wound, hollow fine fibers, or tubular structures. Any of the above filter structures may be made with varying properties and characteristics including different thicknesses, filtration capabilities, pore sizes, and have chemical or other additives incorporated to affect hydrophilicity, hydrophobicity and/or act to control and/or affect the rate of chemical transport through the filter.

Product tank 105 may be made of any material sufficient to hold a solution. In certain embodiments, product tank 105 is made of rigid plastic or polymer. Product tank 105 can vary in volume from 0.5 liters to 50 liters depending on the particular apparatus and the application for which it is being used. In certain embodiments, the product tank is able to be changed depending on the particular situation for which it is being used.

Product tank 105 may further comprise a means for dispensing the chlorine dioxide solution, i.e., dispensing device 135. Exemplary, dispensing devices include, but are not limited to, valves, sprayers, foggers, and the like. Moreover, in certain embodiments, filter 130 is located between the product tank and dispensing device 135 so as to increase the purity of the chlorine. dioxide being dispensed.

Pumps 115 and 120 provide a means for moving, e.g., circulating, the aqueous solution on either side of the filter to facilitate generation of chlorine dioxide and transfer of the chlorine dioxide into the product tank.

Connection to a water source 140 may be any fitting that allows for quick and easy connection to a water source. Exemplary fittings include threaded fittings and quick-connect type fittings to which a water source can be connected to and subsequently removed.

The precursor chemical containing structure used in this embodiment of the invention is made of a material that allows for water to enter the structure and dissolve a partition made of a material that dissolves upon contact with water. Upon dissolving, the precursor chemicals contained in the precursor chemical containing structure begin to react thereby generating chlorine dioxide. Precursor chemicals used in the precursor chemical containing structure are an acid and a chlorite salt. Exemplary chlorite salts are sodium chlorite, lithium chlorite, barium chlorite, calcium chlorite, magnesium chlorite, or potassium chlorite.

Exemplary acids are boric acid, tartaric acid, lactic acid, maleic acid, malic acid, glutaric acid, adipic acid, acetic acid, formic acid, sulfamic acid, sulfuric acid, hydrochloric acid, phosphoric acid, phosphoric anhydride, a sulfuric anyhdride and citric acid. An exemplary chlorite salt/acid combination used in the apparatus of the invention is sodium chlorite and citric acid.

One of ordinary skill in the art understands that adjusting the ratio of the acid and chlorite salt will allow for the variation and control of the speed of the reaction and the amount of chlorine dioxide produced. Exemplary ratios of acid:chlorite salt are: 1:1, 2:1, 3:1, 4:1, 5:1 or any fractional ratio within the exemplified range.

The precursor chemical containing structure used in this embodiment is further described herein.

FIG. 1 is not shown to scale and is not intended to show spatial relationships or fcomponents Further, the components depicted.in FIG. 1 may be connected by one of ordinary skill in the art using appropriate connections, tubing and the like, so as to function as described herein.

Figure 2:
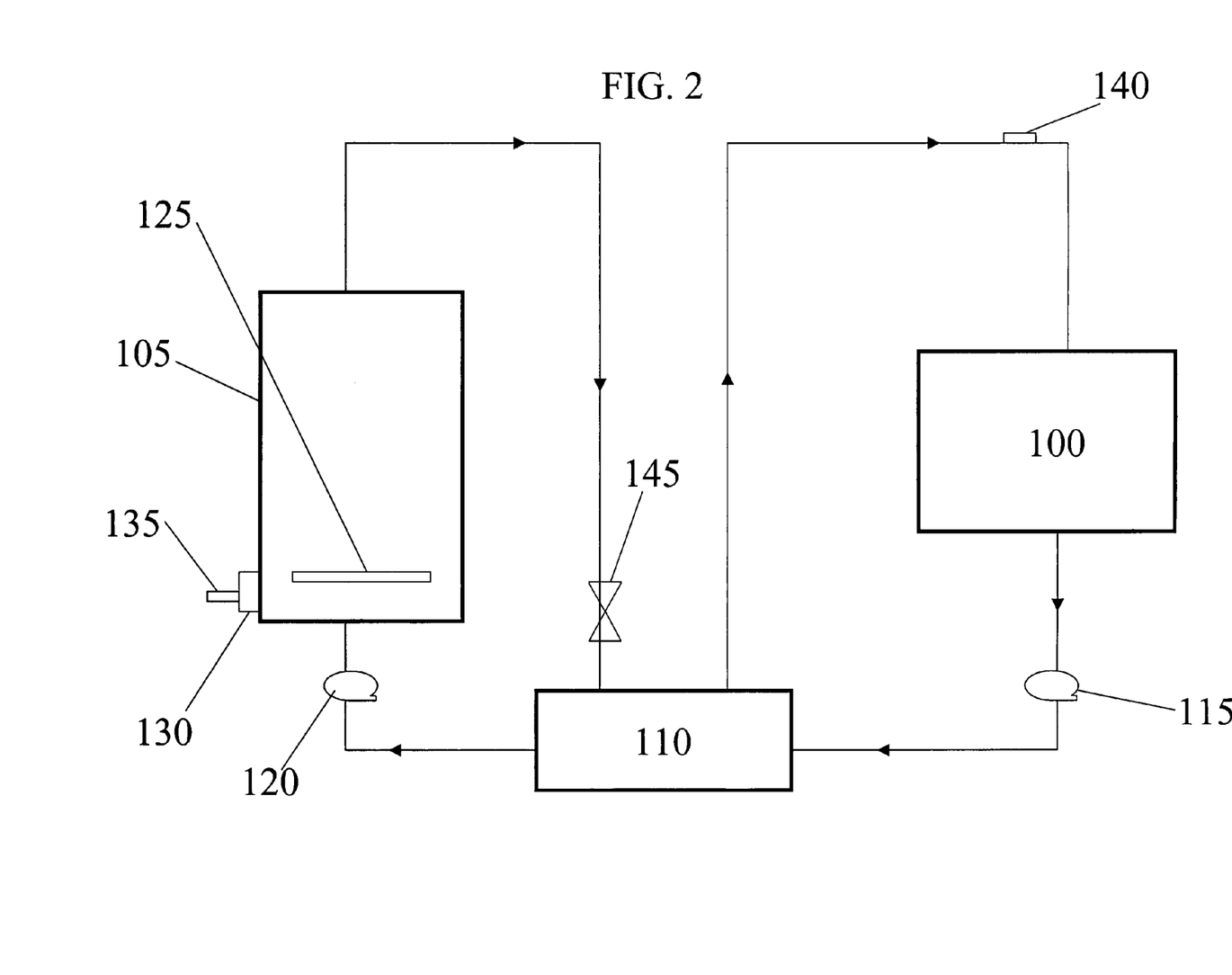
FIG. 2 is a schematic diagram depicting a second embodiment of the invention.

FIG. 2 depicts an embodiment of the invention wherein an aqueous solution is present on the reaction chamber side of the filter but not on the product tank side of the filter. Unlike the embodiment shown in FIG. 1, the chlorine dioxide solution generated in the apparatus depicted in FIG. 2 is transferred as a gas into the product tank and dispensed a gas or as an aqueous chlorine dioxide solution.

The apparatus depicted in FIG. 2 can operate two ways. In one embodiment, the apparatus depicted in FIG. 2 creates a vacuum on the product tank side of the filter thereby resulting in the transfer of the chlorine dioxide across filter 110 and into product tank 105. This embodiment is operates in "vacuum mode." In a second embodiment, a vacuum is not created on the product tank side of the membrane, but rather pump 120 moves air across filter 110 thereby resulting in the transfer of chlorine dioxide across filter 110 and into product tank 105. The use of moving air to transfer the chlorine dioxide across filter 110 is called "sweep mode".

The components shown in FIG. 2 are substantially the same as described for the apparatus as shown in FIG. 1 with the exception of the means for restricting air flow 145 in vacuum mode. The means for restricting air flow 145 results in the creation of a vacuum when pump 120 is powered on. The means for restricting air flow can be, for example, a valve, e.g., a needle valve. The creation of a vacuum results in the transfer of the chlorine dioxide across filter 110 and into product tank 105. Moreover, dispensing device 135 is a device capable of dispensing an aqueous solution of chlorine dioxide or a gas.

FIG. 2 is not shown to scale and is not intended to show spatial relationships or components. Further, the components depicted in FIG. 2 may be connected by one of ordinary skill in the art using appropriate connections, tubing and the like, so as to function as described herein.

Figure 3:
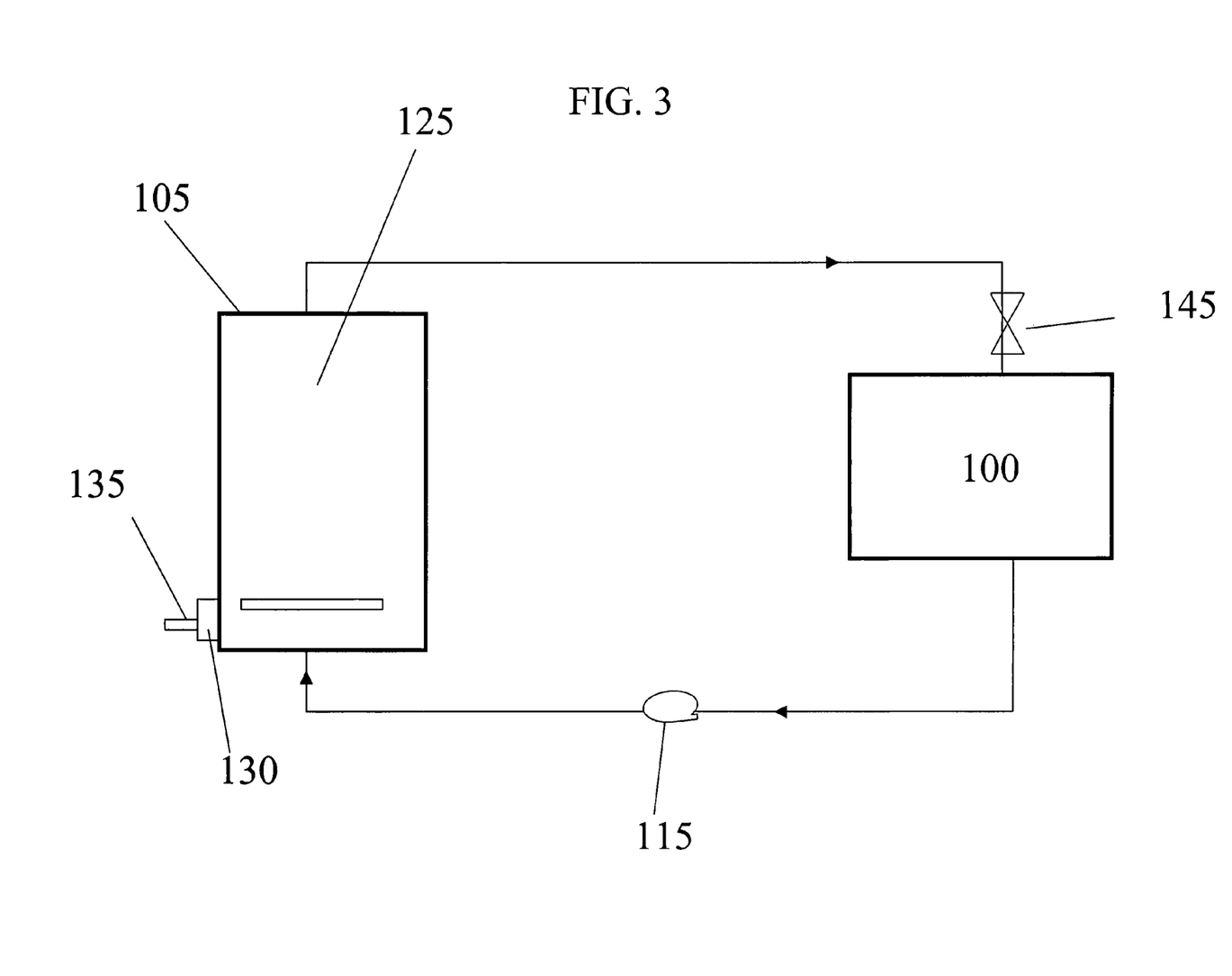
FIG. 3 is a schematic diagram depicting a third embodiment of the invention.

FIG. 3 depicts an embodiment of the invention wherein a filter is not present between reaction chamber 100 and product tank 105. Water may be added to the reaction chamber manually which results in the dissolving of the dissolvable partition in the precursor chemical containing structure and the generation of chlorine dioxide. Pump 115 circulates an air/gas mixture comprising chlorine dioxide through the reaction chamber and into the product tank which results in the transfer of chlorine dioxide to the product tank: This chlorine dioxide solution is transferred into product tank 105 and dispensed by dispensing device 135 as needed. The components in FIG. 3 corresponding to those in FIG. 1 are substantially the same as described for the apparatus as shown in FIG. 1. The apparatus depicted in FIG. 3 further comprises a means for restricting air flow 145. The means for restricting air flow 145 results in the creation of a vacuum when pump 120 is powered on. The means for restricting air flow can be, for example, a valve, e.g., a needle valve. The creation of a vacuum results in the removal of the chlorine dioxide gas from the solution in the reaction chamber and the transfer of the chlorine dioxide to the product tank.

FIG. 3 is not shown to scale and is not intended to show spatial relationships or components. Further, the components depicted in FIG. 3 may be connected by one of ordinary skill in the art using appropriate connections, tubing and the like, so as to function as described herein.

Figure 4:
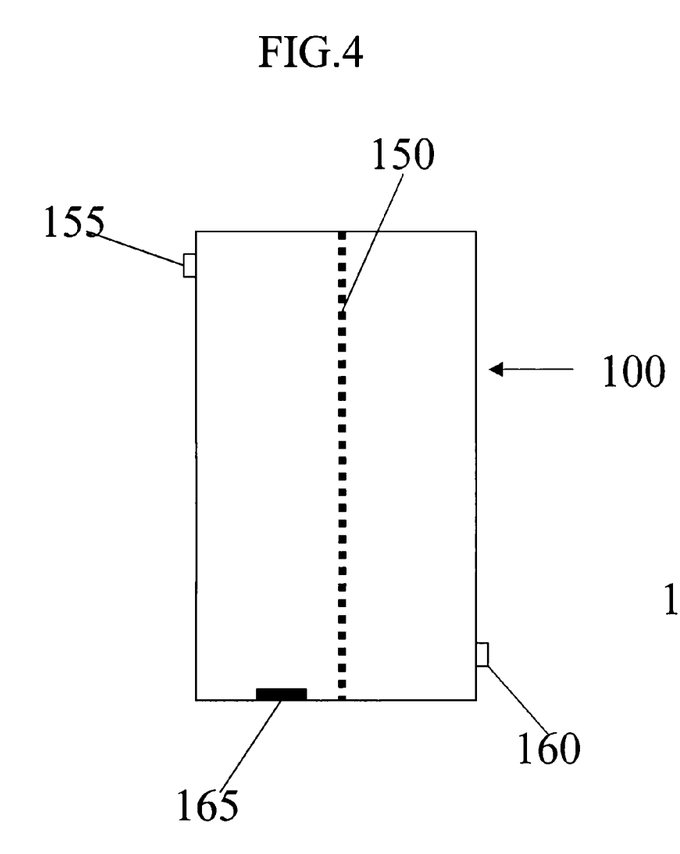
FIG. 4 is a schematic diagram depicting one embodiment of the precursor chemical containing structure of the invention.

FIG. 4 depicts an integrated reaction chamber and precursor chemical containing structure. This integrated structure is a disposable structure that has sufficient precursor chemicals for a single reaction. Reaction chamber 100 has a dissolvable partition 150 separating precursor chemicals. Reaction chamber 100 further comprises means for connecting to the chlorine dioxide apparatus 155 and 160. Optionally, reaction chamber 100 further comprises a means for mixing the contents of the chamber 165. Mixing means 165 can be, for example, a mechanical mixer or a source for introducing bubbles, e.g., air bubbles in to reaction chamber 100 such that the contents of the chamber are mixed during the reaction of the precursor chemicals thereby increasing the speed and/or efficiency of the reaction.

The dissolvable partition 150 can be made of any substance that will keep the precursor chemicals separate and dissolve upon contact with an aqueous solution, thereby allowing the reaction of the precursor chemicals. In an exemplary embodiment, the dissolvable partition is comprised of polyvinyl alcohol.

The precursor chemical containing structures may also have a means for the apparatus to identify the precursor chemical containing structure, for example an electronic barcode, a physical key or a microchip. Such information may be "read" by a corresponding structure incorporated into the apparatus.

Figure 5:
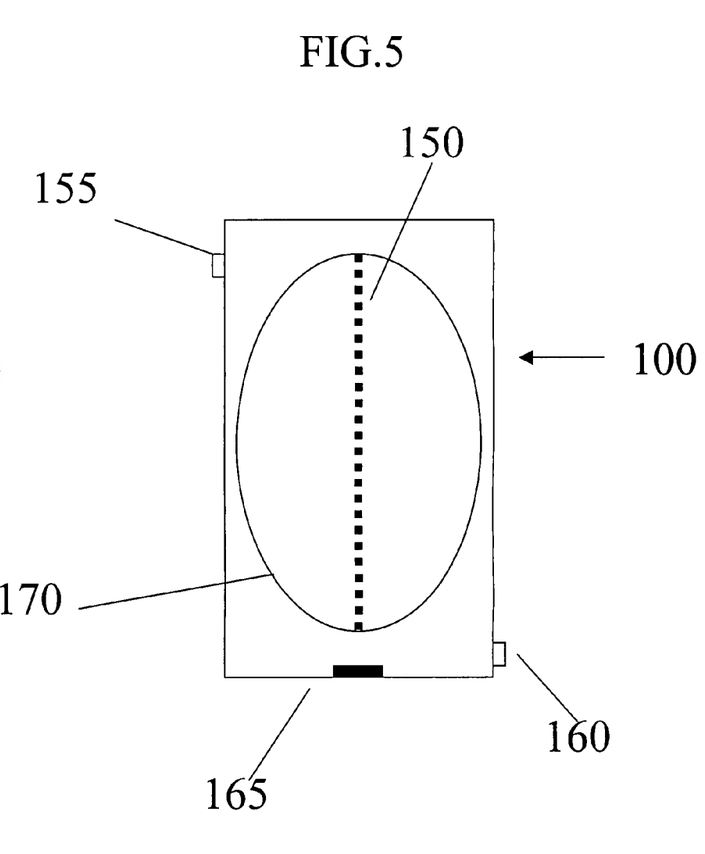
FIG. 5 is a schematic diagram depicting a second embodiment of the precursor chemical containing structure of the invention.

FIG. 5 depicts a second embodiment of the precursor chemical containing structure wherein the reaction chamber is not disposable. In this embodiment, the precursor chemical containing structure 170 is removable and disposable, and has means for connecting the to reaction chamber 100. The corresponding components shown in FIG. 5 are substantially the same as described for the apparatus as shown in FIG. 4.

EXAMPLES

It should be appreciated that the invention should not be construed to be limited to the examples that are now described; rather, the invention should be construed to include any and all applications provided herein and all equivalent variations within the skill of the ordinary artisan.

Example 1

The description of embodiment shown in FIG. 2 describes the embodiment of the present invention wherein a vacuum is created on the product tank side of the filter and a filter is present between the product tank and reaction chamber. In this example, the reaction chamber (100) contains one or more internal structural components that function to hold the precursor chemical containing structure in a specific orientation within the reaction chamber (100).

In this example, to commence operation, approximately 100 mL of water was introduced into the reaction chamber (100) by manually pouring water into the reaction chamber (100) through a water inlet opening. The reaction chamber (100) had a snap-seal re-sealable opening.

In this example approximately 1 liter of water is introduced manually into the product tank (105).

After insertion of the precursor chemical containing structure into reaction chamber (100) and introduction of water into reaction chamber (100) and product tank (105), power was then applied to the apparatus.

After initiation of power, pump (115) began to re-circulate the aqueous chlorine dioxide solution from the reaction chamber (100) through a liquid outlet and is conveyed to the inlet side of the filter (110) passes through the liquid side of the filter (110) and is conveyed back to a liquid inlet of the reaction chamber (100).

In this example, the reaction chamber (100) is constructed of 3 mm thick Type I PVC sheet, and is approximately 51 mm×76 mm×76 mm outside dimensions; and the reaction chamber (100) has a hinged top piece, which is a snap-seal closure to the body of the reaction chamber (100), which may be lifted and lowered as the opening through which water and precursor chemicals were introduced.

In this example the reaction chamber (100) had an outlet connection at the bottom rear of the reaction chamber(100) with a 6 mm inside diameter outlet fitting which is flush with the bottom of the reaction chamber (100), and a 6 mm inside diameter inlet fitting positioned at the rear of the reaction chamber (100) and protrudes approximately 9.5 mm through the rear wall of the reaction chamber (100) approximately 35 mm above the bottom of the reaction chamber and approximately in line with the outlet fitting.

In this example reaction chamber (100) had attached to the hinged reaction chamber top a 3 mm thick PVC sheet formed into an angle, affixed to the top plate with a plastic threaded piece which threads through the angle piece into the top piece and orients the angled piece within the reaction chamber (100).

This angled piece has approximately the inside dimensions of reaction chamber (100) and a plastic piece threaded into the underside of the angled piece, such that, when in place, function to hold the precursor chemical containing structure within reaction chamber (100) in a particular orientation, and below the aqueous solution level contained in reaction chamber (100).

The angled piece has a hole in the rear of the angled piece that allows the inlet fitting of the reaction chamber (100) to fit through it, and direct the inlet water flow to the underside of the angled piece and to the precursor chemical containing structure held within.

The rear of the angled piece extends down at the rear of the reaction chamber (100) to within approximately 2 mm from the bottom of the reaction chamber (100) and acts to prevent the precursor chemical containing structure from blocking the reaction chamber (100) liquid outlet.

In this example filter (110) was a hollow fine fiber type membrane structure,. with a pore size range from 0.02 micron to 0.05 micron, approximately 19 mm in diameter and 140 mm in length, having approximately 930 square centimeters of membrane surface area.

A second pump (120) started when power was provided to the device and the second pump (120) caused air to circulate through the air/gas side of membrane structure (110).

The needle valve (145) caused a vacuum to be created across the gas/air side of the membrane structure (110) which acts to remove the dissolved chlorine dioxide gas from the aqueous solution on the reaction chamber side of the membrane structure (110) to the product tank side of the membrane structure (110).

In this example, the product tank was constructed of 3 mm thick Type I PVC sheet, and has outside dimensions of approximately 89 mm deep×152 mm wide×254 mm tall, and had a net capacity of approximately 2 liters.

The top of the product tank (105) was hinged to the body of the product tank (105) and lifting up of such hinged top allowed entrance of water into the product tank (105) and such top had a snap-seal fit to the body of the product tank (105).

The product tank (105) was fitted with a flush mounted outlet connection near the center of the bottom of the product tank (100) that allowed product to exit for use or for draining. The product tank (105) had two air inlet fittings located approximately 13 mm from the bottom of the product tank (105) on one of the 89 mm product tank (105) sides, and such inlet fittings are approximately evenly spaced apart.

Inside the product tank (105) each air inlet fitting was connected to a porous frit approximately 13 mm in diameter× 102 mm long.

In this example, the product tank (105) also had an air outlet fitting attached to the same 89 mm side of the product tank (105) in the center of the 89 mm dimension, above the two air inlets and approximately 19 mm from the top of the product tank (105).

The air containing the purified chlorine dioxide gas was pumped into the product tank (105) and in this example passed through a porous frit (125), which acted to disperse the air containing the chlorine dioxide gas into a large number of small bubbles containing chlorine dioxide gas. The chlorine dioxide aqueous product solution was dispensed through valve (135).

When the desired concentration of aqueous chlorine dioxide in the product tank (105) was achieved, power was cut off, and the unit was rinsed and purged.

In FIG. 1 rinsing and purging is shown as a manual operation; and is accomplished by the opening of a drain valve, while pouring water into reaction chamber (100) while pump (115) is in operation.

The device exemplified in Example 1 has a footprint of 152 mm by 304 mm, and overall dimensions of 203 mm by 304 mm by 304 mm.

The precursor chemical containing structure used in the apparatus exemplified in Example 1, was a non-woven nylon material having a nominal pore size of 50 microns, which was formed into a pouch with a polyvinyl alcohol water soluble material disposed within, to separate the pouch into two compartments, each compartment containing one of the two precursor chemicals. The non-woven material was heat sealed to form a pouch sealed on all four edges in such a manner that, upon the dissolution of the polyvinyl alcohol material, the pouch remained sealed.

After insertion of the above described pouch into the reaction chamber (100) the polyvinyl alcohol material dissolves and the precursor chemicals commence to react in the presence of water.

Figure 6:
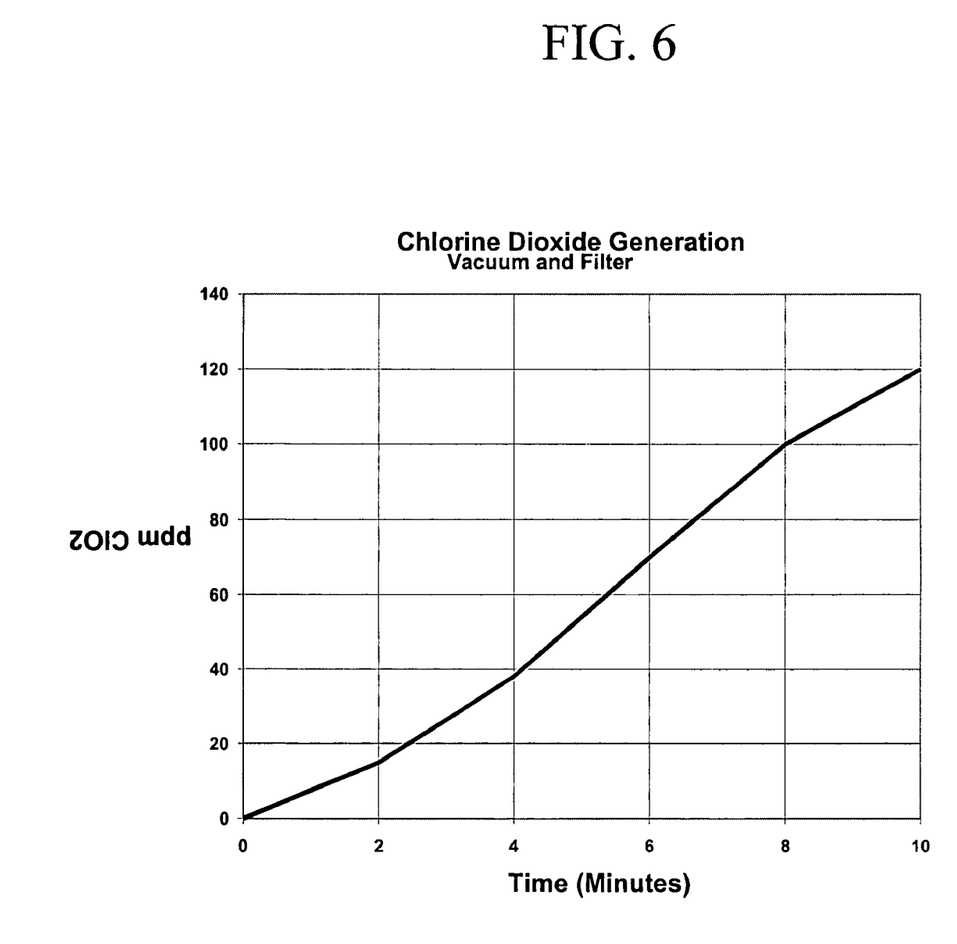
FIG. 6 is a graph depicting test results from an embodiment of the invention shown in FIG. 2.

FIG. 6. is a graph showing values of concentration and generation time for chlorine dioxide generated from the device described in Example 1. Chlorine dioxide concentration indicated in FIG. 6 was determined colorimetrically. The test results shown in FIG. 6 were from the above described device that produced a one liter solution of chlorine dioxide at a concentration of 50 mg/l in approximately 5 minutes. The device was operated with a vacuum of approximately 457 mm of Hg, and an air flow rate of approximately 1 liters per minute on the air/gas side of the membrane, and approximately 1 liter per minute flow on the liquid side of the membrane.

After insertion of the above described pouch into the reaction chamber (100) and after water is added to the reaction chamber the polyvinyl alcohol material dissolves and the precursor chemicals commence to react in the presence of water.

For the test results shown in FIG. 6 the precursor chemical containing structure was a non-woven nylon material having a nominal pore size of 50 microns, which was formed into a pouch with a polyvinyl alcohol water soluble material disposed within, to separate the pouch into two compartments, each compartment containing one of the two precursor chemicals. The non-woven material was heat sealed to form a pouch sealed on all four edges in such a manner that, upon the dissolution of the polyvinyl alcohol material, the pouch remained sealed.

After insertion of the above described pouch into the reaction chamber (100) and after water is added to the reaction chamber the polyvinyl alcohol material dissolves and the precursor chemicals commence to react in the presence of water.

Example 2

The reaction chamber (100) is substantially as described in Example 1. To commence operation, precursor chemicals and water are introduced into the reaction chamber (100). In this example the water is introduced manually. Water is also introduced into the product tank (105), which is substantially as described in Example 1. Power is then applied to the device.

After initiation of power, a pump (115) begins to recirculate the aqueous chlorine dioxide solution from the reaction chamber (100) through the liquid side of the membrane structure (104) and back to the reaction chamber (100).

A second pump (120) starts when power is provided to the device and the second pump (120) causes air to circulate through the air/gas side of the membrane structure (110) into the product tank (105) and back to the membrane structure (110).

Such airflow is sufficient to cause the chlorine dioxide gas being formed to pass through the membrane structure from the liquid side to the air/gas side.

The air containing the pure chlorine dioxide gas is pumped into the product tank (105) and in this example passes through one or more structures at the bottom of the product tank (105), for example one or more porous frits (125), which act to disperse the air containing the chlorine dioxide gas into a large number of small bubbles containing chlorine dioxide gas as the air rises up through the liquid of the product tank (105), thus increasing the surface contact area between the air containing the chlorine dioxide gas and the product storage liquid and facilitating the rate at which the chlorine dioxide gas is dissolved in the water in the product tank (105).

When the desired concentration of aqueous chlorine dioxide in the product tank (105) is achieved, power is cut off, either manually or automatically and the unit is rinsed and purged. The chlorine dioxide aqueous product solution is dispensed through valve (135). The rinsing and purging is preformed as described in Example 1.

Figure 7:
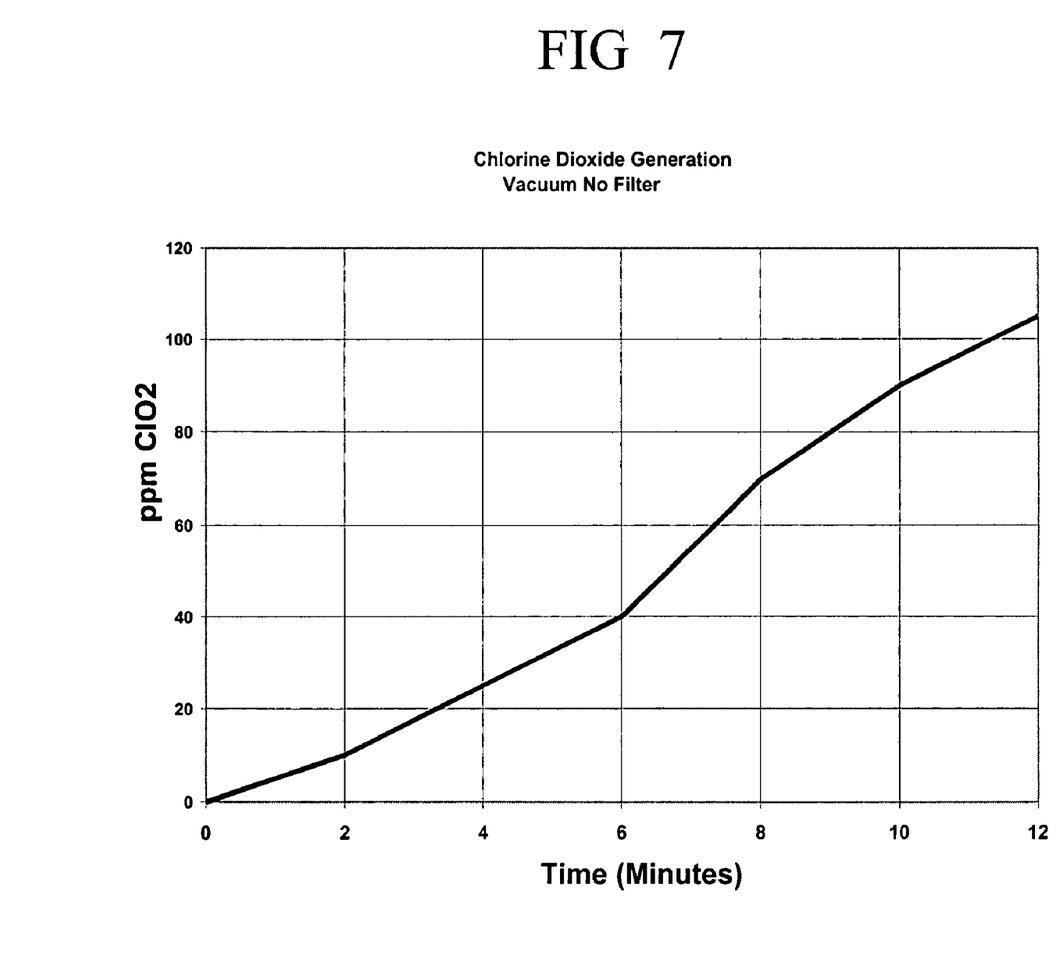
FIG. 7 is a graph depicting test results from an embodiment of the invention shown in FIG. 2.

A device incorporating the features, characteristics.and design described in embodiment 1 has a footprint of 152 mm by 304 mm, and overall dimensions of 203 mm by 304 mm by 304 mm. FIG. 7. is a graph showing values of concentration and generation time for chlorine dioxide generated from.a device based on Example 2. The test results shown in FIG. 7 were from the above described device that produced a one liter solution of chlorine dioxide having a purity of 95.4% at a concentration of 50 mg/l in approximately 4 minutes. The device was operated with an air flow of approximately 3 liters per minute on the air/gas side of the membrane, and approximately 1 liter per minute flow on the liquid side of the membrane.

A concentration of approximately 100 mg/l of aqueous solution of chlorine dioxide was achieved in approximately 8 minutes.

Tests conducted using standard methods indicated a chlorine dioxide purity of 95.4% using the EPA calculation method to determine purity described in the EPA Guidance Manual: Alternative Disinfectants and Oxidants, April, 1999.

Standard methods 4500-C102-E, EPA method 300.Ob and DPD colorimetric analysis were used in determining product purity. Chlorine dioxide concentration indicated in FIG. 7 was determined colorimetric.

Example 3

The description of Example 3 shown in FIG. 3 describes the variation of the present invention.

The reaction chamber (100) is constructed substantially as described in Example 1 except that the reaction chamber (100) in Example 3 incorporates inlet and outlet fittings to allow the flow of air through the reaction chamber (100), and the creation of a vacuum within the reaction chamber (100), for example by placing a flow restriction device, such as a needle valve (145) prior to the air inlet to the reaction chamber (100), and placing a pump (104) on the air outlet of the reaction chamber (100).

In this example the reaction chamber (100) has inlet and outlet connections at the top of the reaction chamber (100) and an outlet connection at the bottom of the reaction chamber (100) that functions to dispense the product and act as a drain connection. In this example the reaction chamber (100) inlet connection also has a 9.5 mm OD plastic tube that extends from the inlet to approximately 3 mm from the bottom of the reaction chamber (100).

The vacuum thus created within the reaction chamber (100) provides the motive force to remove dissolved chlorine dioxide gas from the chlorine dioxide aqueous solution that is being created by the reaction of the precursor chemicals within the reaction chamber (100).

The chlorine dioxide gas thus removed is immediately transferred to the product tank (105), and the product tank (105) is constructed substantially as described in Example 1. The flow of chlorine dioxide gas into the product tank (105) is accomplished in such a manner as to cause the chlorine dioxide gas to dissolve in the water contained in the product storage tank (105), for example by providing one or more porous flits or similar structures (125) which act to disperse the incoming air stream containing the chlorine dioxide gas into a large number of small bubbles, thus promoting the speed with which the chlorine dioxide is dissolved into the water in the product tank (105). The chlorine dioxide aqueous solution is dispensed through valve (135), this same valve (110) is used to drain and rinse the device.

The advantage of this embodiment is its simplicity and elimination of the filter and second pump components of Examples 1 and 2, thus reducing the overall cost of the device.

Figure 8:
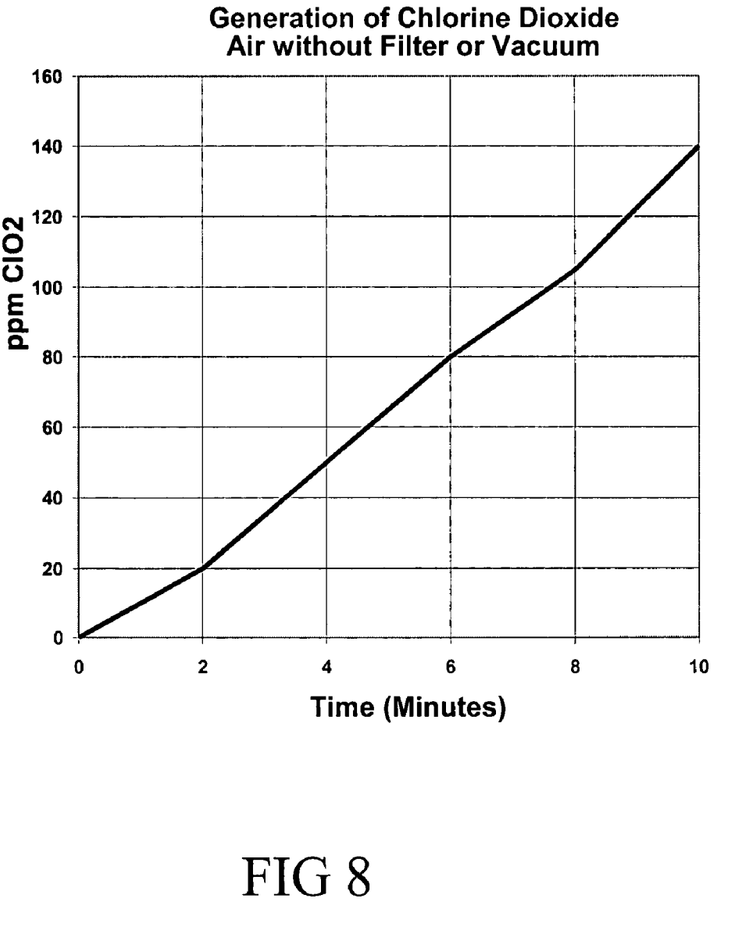
FIG. 8 is a graph depicting test results from the embodiment of the invention shown in FIG. 3.

Test information for Example 3 is shown in FIG. 8. The results shown in FIG. 8 were as a result of operation at a vacuum of approximately 450 mm Hg and an airflow of approximately 2 liters per minute.

This configuration produced a one liter solution of aqueous chlorine dioxide with a concentration of approximately 50 mg/l of chlorine dioxide in about 7 minutes, and approximately 100 mg/l in about 11 minutes. Chlorine dioxide concentration indicated in FIG. 8 was determined colorimetric.

In all above described Examples 2,000 mg of sodium chlorite and 4,000 mg of citric acid were the amounts of precursor chemicals used.

In all the above described Experiments one liter of product solution was created and 100 mL of water was used to create the aqueous chlorine dioxide solution in the reaction chamber.

Incorporation by Reference

The contents of all references, patents, pending patent applications and published patents, cited throughout this application are hereby expressly incorporated by reference.

Equivalents

Those skilled in the art will recognize, or be able to ascertain using no more than routine experimentation, many equivalents to the specific embodiments of the invention described herein Such equivalents are intended to be encompassed by the instant invention and the following claims.

What is claimed is:

1. An apparatus for the generation of chlorine dioxide comprising;
    a reaction chamber comprising a precursor chemical containing structure;
    a chlorine dioxide product tank;
    an aqueous solution;
    a filter placed between the product tank and the reaction chamber;
    a pump on the product tank side of the filter; and
    a pump on the reaction chamber side of the filter;
    wherein the reaction chamber, product tank, and pumps are operatively connected;
wherein the precursor chemical containing structure comprises a structure containing precursor chemicals separated by a dissolvable partition, wherein the partition dissolves when contacted by the aqueous solution thereby allowing the reaction of the precursor chemicals, and wherein the pump on the reaction chamber side of the filter circulates an aqueous solution.

2. The apparatus of claim 1, wherein the pump on the product tank side circulates an aqueous solution into which chlorine dioxide is transferred.

3. The apparatus of claim 2, further comprising at least one porous frit in the product tank to increase the rate and/or amount of chlorine dioxide transferred into the aqueous solution.

4. The apparatus of claim 2, wherein the precursor chemical containing structure contains a chlorite salt and an acid.

5. The apparatus of claim 4, wherein the chlorite salt is selected from the group consisting of sodium chlorite, lithium chlorite, barium chlorite, calcium chlorite, magnesium chlorite, and potassium chlorite.

6. The apparatus of claim 5, wherein the chlorite salt is sodium chlorite.

7. The apparatus of claim 4, wherein acid is selected from the group consisting of boric acid, tartaric acid, lactic acid, maleic acid, malic acid, glutaric acid, adipic acid, acetic acid, formic acid, sulfamic acid, sulfuric acid, hydrochloric acid, phosphoric acid, phosphoric anhydride, a sulfuric anyhdride and citric acid.

8. The apparatus of claim 7, wherein the acid is citric acid.

9. The apparatus of claim 2, wherein the precursor chemical containing structure contains sodium chlorite and citric acid.

10. The apparatus of claim 9, wherein the precursor chemical containing structure contains twice the weight of citric acid as compared to sodium chlorite.

11. The apparatus of claim 9, wherein the precursor chemical containing structure contains three times the weight of citric acid as compared to sodium chlorite.

12. The apparatus of claim 2, wherein the dissolvable partition is comprised of polyvinyl alcohol.

13. The apparatus of claim 2, further comprising a dispensing device.

14. The apparatus of claim 13, further comprising a filter between the product tank and the dispensing device.

15. The apparatus of claim 2, further comprising a means for atomizing the chlorine dioxide solution.

16. The apparatus of claim 2, wherein the reaction chamber comprising a precursor chemical containing structure is disposable.

17. The apparatus of claim 2, wherein the precursor chemical containing structure within the reaction chamber is disposable.

18. The apparatus of claim 2, further comprising a means for mixing the solution in the reaction chamber.

19. The apparatus of claim 2, wherein the chlorine dioxide is at least 50% pure.

20. The apparatus of claim 2, further comprising a computer interface to control the apparatus.

* * * * *